United States Patent Office 3,246,031
Patented Apr. 12, 1966

3,246,031
PHENOXYPROPYLGUANIDINE COMPOUNDS
Alfred Campbell, Ann Arbor, Mich., assignor to Parke, Davis & Company, Detroit, Mich., a corporation of Michigan
No Drawing. Filed Feb. 23, 1965, Ser. No. 434,685
7 Claims. (Cl. 260—501)

This application is a continuation-in-part of my copending application Serial No. 80,975 filed January 6, 1961, and now abandoned.

The present invention is concerned with novel phenoxypropylguanidines, with acid-addition salts thereof, and with methods for the production of such compounds. More particularly, the invention is concerned with penoxypropylguanidines which can be represented in their free base form by the formula

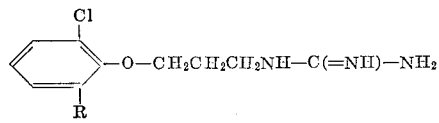

where R represents a hydrogen or chlorine atom.

The products of the invention can be obtained in the free base form having the formula given above or in the form of one of their acid-addition salts with inorganic or organic acids. Some representative acid-addition salts are the hydrochloride, hydrobromide, hydroiodide, hemisulfate, nitrate, phosphate, citrate, acetate, tartrate, salicylate, benzoate, benzenesulfonate, and the like.

When the products of the invention are obtained as acid-addition salts, these salts are converted into their free base form by making an aqueous solution of the acid-addition salt basic with a base such as sodium hydroxide or potassium hydroxide. Alternatively the free base form can be obtained by passing an aqueous solution of the acid-addition salt over a strongly basic anion (hydroxide ion) exchange resin such as Amberlite IRA–400 [OH⁻] resin and the like, eluting with aqueous alcohol, and evaporating the solution to dryness. Formation of the various salts envisioned by and included in this invention can be carried out by reacting the selected free base with the selected acid in an unreactive solvent or by reacting the free base with an excess of aqueous acid, whereby the excess aqueous acid serves as solvent for the reaction. In either reaction, subsequent evaporation of the solution to dryness yields the desired salt. Further, the acid-addition salts can be interconverted by passing them over the desired anionic form of a strongly basic ion exchange resin such as Amberlite IRA–400 and the like. Thus, if the novel phenoxypropylguanidines are isolated as their nitrate acid-addition salts, these nitrate salts can be converted into the corresponding hemisulfate salts by passing them over a strongly basic [SO₄⁼] ion exchange resin such as Amberlite IRA–400 [SO₄⁼] resin. Similarly the nitrate salts can be converted into the corresponding hydrochloride salts by passing them over a strongly basic [Cl⁻] ion exchange resin such as Amberlite IRA–400 [Cl⁻] resin.

In accordance with the invention, the new phenoxypropylguanidines can be produced by reacting a compound of the formula

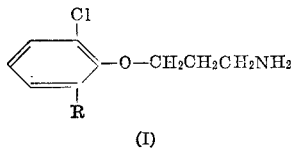

wherein R has the same significance as given above, with an acid addition salt of a reactive guanidine compound of the formula

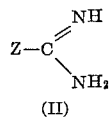

wherein Z represents any easily displaceable moiety. For purposes of this invention, such moieties are: hydrocarbonthio; hydrocarbonoxy; unsubstituted, mono or poly substituted unsaturated nitrogen heterocyclic radicals containing at least two nitrogen atoms in their ring systems and connected to the guanidine carbon atom through nitrogen, and other displaceable radicals. Some examples are: lower alkylthio radicals such as methylthio and ethylthio; lower alkoxy radicals such as methoxy and ethoxy; pyrazolyl; substituted pyrazolyl radicals such as dialkylpyrazolyl, alkyl-arylpyrazolyl, and dialkylmonohalopyrazolyl; imidazolyl, triazolyl; and tetrazolyl. The reaction can be conveniently carried out by contacting the reactants either in the absence of a solvent or in the presence of unreactive solvents such as water, alcohols, chlorobenzene, dimethylformamide, and the like. The preferred solvent is water or a mixture of ethanol and water which may be varied widely in its composition. Equimolar quantities of reactants are usually used in this reaction although an excess of either reagent is not harmful. Preferably a slight excess of amine is employed. The reaction is usually carried out at temperatures between 20–150° C. although satisfactory results can also be obtained somewhat outside of this temperature range. The preferred reaction temperature range is 75–120° C. The product is isolated directly as an acid-addition salt or, following treatment with a base, as the corresponding free base.

In carrying out the foregoing process a preferred method involves reacting an acid-addition salt of 3,5-dimethyl-1-guanylpyrazole, salts corresponding to Formula II wherein

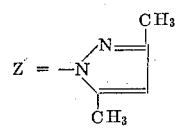

with a phenoxypropylamine of Formula I, whereby the products of this invention are isolated directly as their acid-addition salts. If 3,5-dimethyl-1-guanylpyrazole nitrate is used in this reaction phenoxypropylquanidine nitrates are obtained. These nitrates can be converted to the corresponding free bases or to other acid-addition salts by procedures discussed earlier.

Another preferred method for carrying out the foregoing process involves reacting an acid-addition salt of 2-methyl-2-thiopseudourea (salts corresponding to Formula II wherein Z is a metrylthio radical) with a phenoxypropylamine of Formula I, whereby the products of this invention are isolated directly as acid addition salts. If 2-methyl-2-thiopseudourea hemisulfate is used in this reaction, phenoxypropylguanidine hemisulfates are obtained. Conversion to the corresponding free bases or to other acid-addition salts is accomplished by methods hereinbefore described.

In accordance with a second process, compounds of the invention can be prepared by reacting a phenoxypropylamine of Formula I, preferably as an acid-addition salt such as the hydrobomide or nitrate, with cyanamide or dicyandiamide. The reaction can be conveniently carried out by contacting the reactants either in the absence of a solvent or in the presence of unreactive solvents such as water, alcohols, chlorobenzene, dimethylformamide, and the like. When cyanamide is used as the active intermediate, fusion techniques, in the absence of solvents, can be conveniently employed. In such a reaction the cyanamide and a salt of a phenoxypropylamine of Formula I are mixed together and heated to the point of fusion. Equimolar quantities of reactants are usually used in this reaction although an excess of either reagent is not harmful. Preferably a slight excess of amine salt is employed. The temperature of the reaction depends upon the fusion point of the reaction mixture. Reaction of the amine salts with cyanamide can also be carried out in aqueous, alcoholic, or non-aqueous solution. Equimolar quantities of reactants are usually used in this reaction although an excess of either reagent is not harmful. Preferably a slight excess of amine salt is employed. The reaction is usually carried out at temperatures between 20–150° C. although satisfactory results can also be obtained somewhat outside of this temperature range. The preferred temperature range is 75–120° C. When dicyandiamine is employed, the fusion technique described above is preferred.

The compounds of this invention are valuable pharmacological agents. They exhibit anti-hypertensive activity and are relatively free of mydriatic side effects; the compounds of exhibit anti-bacterial activity. They may be administered orally or parenterally. Oral administration is preferred.

The following examples illustrate the invention:

*Example 1*

A solution of 18.5 g. of 3-(o-chlorophenoxy)-propylamine and 20.0 g. of 3,5-dimethyl-1-guanylpyrazole nitrate in 200 ml. ethanol is refluxed for eight hours. The solvent is removed under reduced pressure and after trituration of the residue with three 200 ml. portions ethyl ether, 3-(o-chlorophenoxy)-propylguanidine nitrate remains; M.P. 158–159° C. after recrystallization from methanol.

By substituting an equimolar quantity of 3-(2,6-dichlorophenoxy)-propylamine for the chlorophenoxypropylamine in the above procedure, one obtains 3-(2,6-dichlorophenoxy)-propylguanidine nitrate; M.P. 158–160° C. after recrystallization from methanol. To convert the product to the free base, an aqueous solution of 20.0 g. 3-(2,6-dichlorophenoxy)-propylguanidine nitrate is made basic with sodium hydroxide, the basic solution extracted three times with ether, the ether solution dried over anhydrous sodium sulfate, and the solvent removed under reduced pressure to give 3-(2,6-dichlorophenoxy)-propylguanidine as the free base; M.P. 99° C after recrystallization from benzene/petroleum ether.

*Example 2*

To a solution of 4.4 g. 3-(2,6-dichlorophenoxy)-propylamine in 25 ml. ethanol is added 2.37 g. 3-methyl-5-phenyl-1-guanylpyrazole hemisulfate in 50 ml. water. The resulting mixture is heated on a steam bath for four hours and part of the solvent removed by evaporation. The remaining solution is filtered and the filtrate cooled to 0° C. After two hours at this temperature the 3-(2,6-dichlorophenoxy)-propylguanidine hemisulfate which has precipitated is filtered; M.P. 218–219° C. after recrystallization from water.

*Example 3*

A solution of 18.6 g. 3-(o-chlorophenoxy)-propylamine and 17.4 g. 3.5-dimethyl-1-guanylpyrazole hydrochloride in 150 ml. water is heated under reflux for ten hours. The cooled solution is extracted with three 100 ml. portions benzene and evaporated to dryness leaving a residue of 3-(o-chlorophenoxy)-propylguanidine hydrochloride.

*Example 4*

To a solution of 8.8 g. 3-(2,6-dichlorophenoxy)-propylamine in 25 ml. ethanol is added 2.8 g. 2-methyl-2-thiopseudourea hemisulfate in 50 ml. 50% ethanol. The resulting mixture is refluxed for two hours. The solvent is then removed by distillation under reduced pressure leaving a residue of 3-(2,6-dichlorophenoxy)-propylguanidine hemisulfate; M.P. 218–219° C. after recrystallization from water.

*Example 5*

To a stirred solution of 18.66 g. 3-(o-chlorophenoxy)-propylamine in 50 ml. water at 90° C. is added a solution of 17.1 g. 2-methyl-2-thiopseudourea hydrobromide in 50 ml. of water. The resulting mixture is heated on a steam bath for three hours, concentrated, and the concentrated aqueous solution passed over a strongly basic [OH⁻] ion exchange resin, eluted with aqueous alcohol, and the solvent removed under reduced pressure leaving 3-(o-chlorophenoxy)-propylguanidine.

*Example 6*

A solution of 4.2 g. cyanamide and 26.7 g. 3-(o-chlorophenoxy)-propylamine hydrobromide in 100 ml. ethanol is refluxed for six hours, the solution evaporated to dryness, and the residue triturated with ether leaving 3-(o-chlorophenoxy)-propylguanidine hydrobromide.

*Example 7*

Dicyandiamide (8.4 g.) and 25.8 g. 3-(2,6-dichlorophenoxy)-propylamine hydrochloride are intimately mixed, placed in a round bottom flask equipped with a reflux condenser and a thermometer, and the reaction vessel immersed in a mechanically stirred oil bath. The mixture is fused at 180° C. for three hours, subsequently cooled, water added, and the insolubles filtered. The aqueuos solution is made alkaline with sodium hydroxide, extracted with ether, the ether solution dried over sodium sulfate, filtered, and evaporated to dryness leaving a residue of 3-(2,6-dichlorophenoxy)-propylguanidine; M.P. 99° C. after recrystallization from benzene/petroleum ether.

*Example 8*

When an aqueous solution of 10.0 g. 3-(o-chlorophenoxy)-propylguanidine hemisulfate is passed over a column containing 60.0 g. of a strongly basic [Cl⁻] ion exchange resin, the column eluted with aqueous alcohol, and the alcohol removed in vacuo, 3-(o-chlorophenoxy)-propylguanidine hydrochloride remains.

Likewise, when an aqueous solution of 10.0 g. 3-(o-chlorophenoxy)-propylguanidine hydrochloride is passed over a column containing 60.0 g. of a strongly basic [SO₄=] ion exchange resin, the column eluted with aqueous alcohol and the solvent evaporated, 3-(o-chlorophenoxy)-propylguanidine hemisulfate is obtained; M.P. 197–198° C. after recrystallization from water.

*Example 9*

3-(o-chlorophenoxy)-propylguanidine (5.0 g.) is dissolved in a 20% excess of 50% aqueous acetic acid and the solution evaporated to dryness under reduced pressure leaving a residue of 3-(o-chlorophenoxy)-propylguanidine acetate; M.P. 125° C. after recrystallization from methanol/ether.

Using the same procedure, 3-(2,6-dichlorophenoxy)-propylguanidine acetate is prepared; M.P. 130–131° C. after recrystallization from methanol/ether.

*Example 10*

A 10% aqueous solution of sulfuric acid is added to 5.0 g. 3-(o-chlorophenoxy)-propylguanidine in 10 ml. methanol. Removal of the solvent leaves 3-(o-chlorophenoxy)-propylguanidine hemisulfate; M.P. 197–198° C. after recrystallization from water.

Using the same procedure, 3-(2,6-dichlorophenoxy)-propylguanidine hemisulfate is prepared; M.P. 218–219° C. after recrystallization from water.

Example 11

To 5.0 g. 3-(2,6-dichlorophenoxy)-propylguanidine in 50 ml. ether is added a solution of 2.75 g. benzoic acid in 10 ml. ether. Removal of the solvent leaves 3-(2,6-dichlorophenoxy)-propylguanidine benzoate; M.P. 157–158° C. after recrystallization from methanol/ether.

I claim:
1. A member selected from the group consisting of a free base and its non-toxic acid-addition salts, said free base having the formula

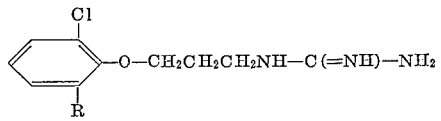

where R is a member selected from the group consisting of hydrogen and chlorine atoms.
2. 3-(o-chlorophenoxy)-propylguanidine.
3. 3-(o-chlorophenoxy)-propylguanidine nitrate.
4. 3-(o-chlorophenoxy)-propylguanidine hemisulfate.
5. 3-(o-chlorophenoxy)-propylguanidine acetate.
6. 3-(2,6-dichlorophenoxy)-propylguanidine.
7. 3-(2,6-dichlorophenoxy)-propylguanidine nitrate.

References Cited by the Examiner
UNITED STATES PATENTS

| | | | |
|---|---|---|---|
| 3,079,403 | 2/1963 | Weinstock | 260—570.5 X |
| 3,099,599 | 7/1963 | Copp et al. | |
| 3,174,997 | 3/1965 | Campbell | 200—564 X |

OTHER REFERENCES

Baltzly et al., "Journal American Chemical Society," vol. 64, pages 2231–2232 (1942).

Burger, "Medicinal Chemistry," 2nd Ed., page 43 (1960).

Kuroda, "Chemical Abstracts," vol. 29, page 1504 (1935).

CHARLES B. PARKER, *Primary Examiner.*
R. V. HINES, *Assistant Examiner.*